United States Patent [19]

Trant

[11] Patent Number: 5,678,621

[45] Date of Patent: Oct. 21, 1997

[54] TIRE DERIMMING MACHINE

[75] Inventor: Carl A. Trant, Palmer, Mass.

[73] Assignee: Tire Recycling and Development, Inc., Palmer, Mass.

[21] Appl. No.: 641,799

[22] Filed: May 2, 1996

[51] Int. Cl.$^6$ .................................................. B60C 25/01
[52] U.S. Cl. ........................... 157/1.1; 157/1.2; 29/426.4
[58] Field of Search ............................. 157/1, 1.1, 1.11, 157/1.17, 1.2, 1.21, 426.4, 426.5; 29/700

[56] References Cited

U.S. PATENT DOCUMENTS

| | | | |
|---|---|---|---|
| 1,578,760 | 3/1926 | Replogle | 157/1.1 |
| 2,488,539 | 11/1949 | Holbrook | 157/1.2 |
| 2,536,139 | 1/1951 | Ritter | 157/1.2 |
| 2,618,320 | 11/1952 | Deysher et al. | 157/1.2 |

Primary Examiner—D. S. Meislin
Assistant Examiner—Joni B. Danganan
Attorney, Agent, or Firm—Fishman, Dionne, Cantor & Colburn

[57] ABSTRACT

A versatile tire derimming machine comprises three crushing arms articulated at a top of the device, hydraulic actuators for each arm and a power multiplying arrangement. The device is generally mounted on a rotating means of a mechanical arm such as a hydraulic excavator or a log loader and can be remotely moved into position to "pick" a tire and wheel combination from a resting place, place the tire and wheel combination in a desired orientation and deform the wheel therein thus facilitating removal of the tire therefrom quickly and easily. The machine may be configured for and used on every size wheel and tire combination but is particularly suited for use in derimming large truck tires from their wheels. The device avoids the need for a worker lifting or moving the tire/wheel combinations which can easily weight 120 lbs.

12 Claims, 8 Drawing Sheets

TIRE DERIMMING MACHINE

BACKGROUND OF THE INVENTION

1. Filed of the Invention

The invention relates to the filed of resource reclamation, particularly of tires and wheels for rubber and metal, respectively. More specifically, the invention relates to a device to aid in removing tires from wheels (particularly of large wheels) by deforming the wheels thereby disengaging the tire.

2. Prior Art

Tire derimming machines having the purpose of deforming metal rims to remove them from the tires mounted thereon have been in use for a number of years by junk yards and resource reclamation facilities. Most of these machines require reasonably intense physical labor to place a tire and rim combination in position on a prior art device to be deformed. In the case of smaller automobile tires, the job is burdensome but not generally dangerous to the operator, however where the much larger and heavier truck tires and wheels are concerned, there is a real danger of physical injury to the operator if he is required to lift or move the combination manually. To date there has been no effective means for accomplishing the removal of a rim from a tire which does not require human loading and no means of providing an apparatus capable of directly retrieving a tire/rim combination to be separated from a depot of such combinations and so removing the tire.

SUMMARY OF THE INVENTION

The above-discussed and other drawbacks and deficiencies of the prior art are overcome or alleviated by the tire derimming machine of the invention.

The invention provides a device capable of retrieving and separating a tire and rim combination; the device is particularly beneficial for separating large truck tires and wheels which are too heavy to be wielded by most workers.

The invention employs a plurality of (and preferably three) hydraulic cylinders which actuate an inward movement of a plurality of (and preferably three) crushing arms to deform the wheel thus removing the same from the tire. Peripheral dimensions of the device and size of the cylinders are kept to a minimum by employing a power multiplying arrangement. Power multiplication is achieved by employing a floating member described herein as a walking beam which provides a set of upper pivot pins for articulating the canister end of the cylinders, and a set of lower pivot pins which articulate inner ends of connecting members, two being supplied for each crushing arm. Opposite ends of the connecting members are attached to each of three arm bracket pivot pins. The bracket pivot pins also provide attachment for the piston end of the three hydraulic cylinders.

Actuation of the three cylinders causes the walking beam to be pushed upwardly which in turn pulls the inner ends of the connecting members upwardly, decreasing their effective lateral length and therefore imparts an inward movement to the crushing arms at a mechanical advantage relative to the amount of force generated by the cylinders alone.

Inward movement of the crushing arms is utilized to pinch the wheel being acted upon deforming it centrally. Subsequent hereto the device is generally rotated by about 60° and the wheel is pinched again. The wheel is thus released from the tire and can easily be separated by the device by lifting the tire while the wheel remains on the ground.

As will be appreciated, the pinching action of the device is also employed to pick a tire/wheel combination from a depot thereof and position it to be acted upon.

The device of the invention is most preferably mounted on a hydraulic excavator or on a log loader for the ability to easily move the device and rotate the same without difficulty.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
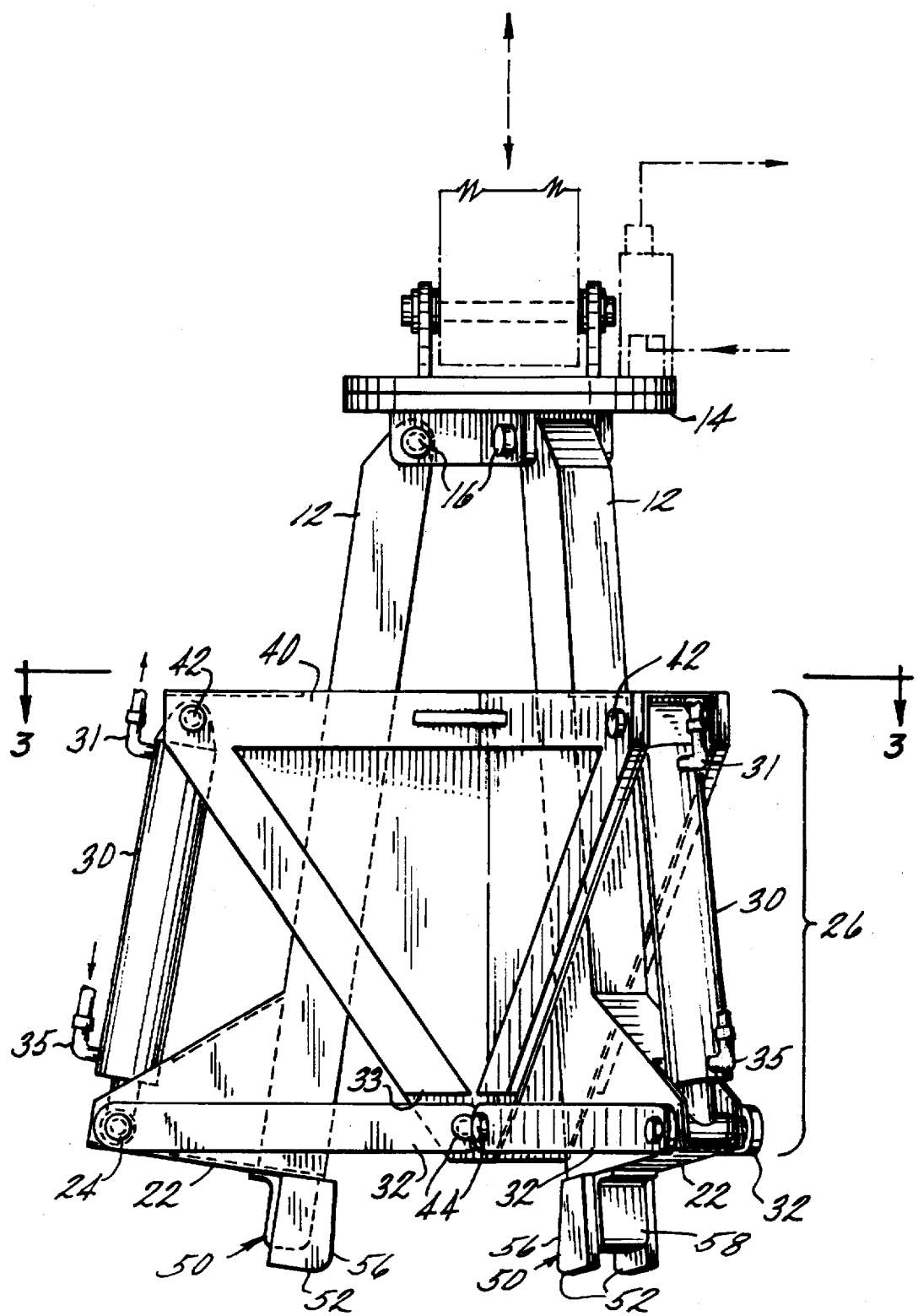
FIG. 1 is an elevational view of the device of the invention in the fully open position.
Figure 2:
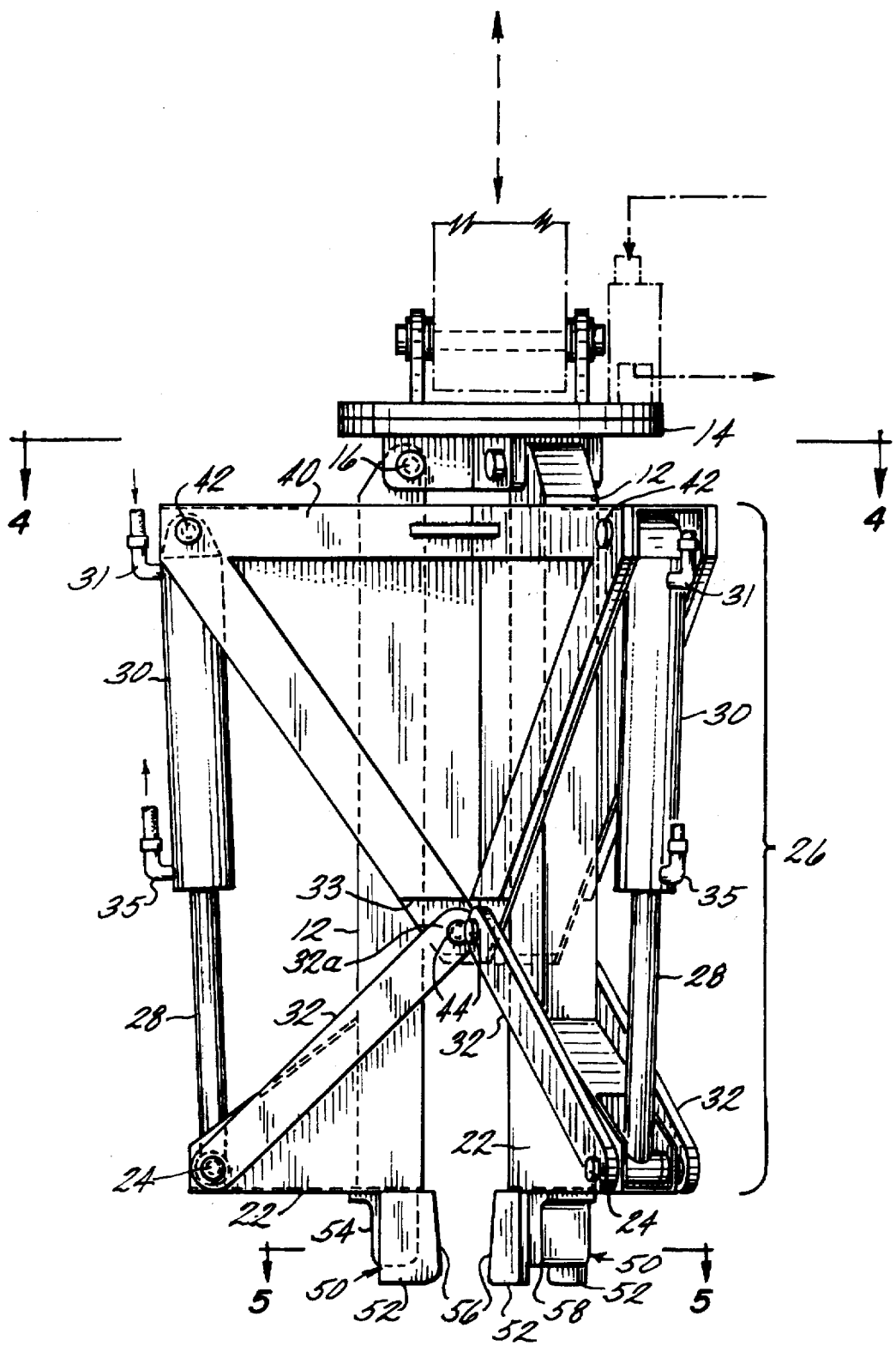
FIG. 2 is an evalational view of the device of the invention in the fully closed position.
Figure 3:
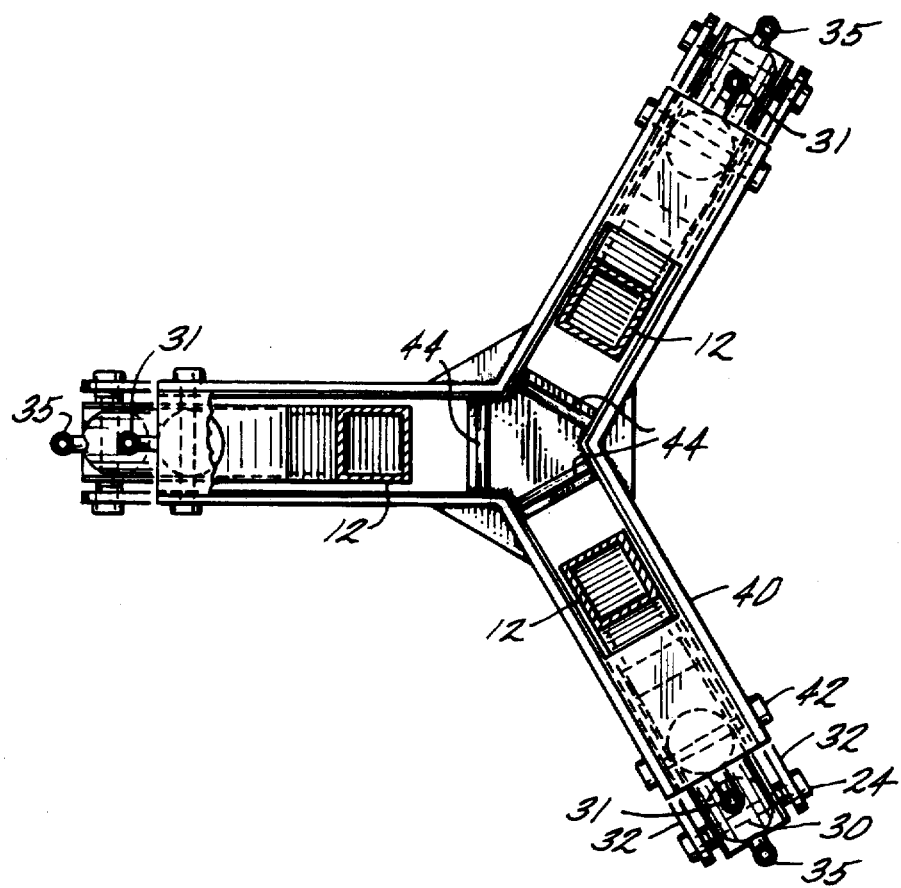
FIG. 3 is a sectional of the invention taken along section line 3—3 in FIG. 1.

The invention most preferably employs a three arm construction intercoupled with a leverage creating device lexicographically identified as a walking beam. It should be understood however that more or fewer arms may be desirable for particular applications. The walking beam itself (FIG. 3) is a triple arm or three spoke type layout and extends downwardly to roughly a triangular portion at a lower extent thereof. The walking beam moves upwardly upon actuation of the preferably three hydraulic cylinders and draws with it a plurality of connecting arms providing the significant torque to the crushing arms required to deform the wheel of a tire/wheel combination thereby separating the two. Inward crushing power imparted to the crushing arms by the combination of the preferred three cylinder arrangement and the mechanical advantage of the walking beam and connecting rod is a significantly greater force than the cylinders provide alone. Referring directly to FIG. 1, the device of the invention is illustrated in the fully open position wherein the walking beam 40 is at its lowest possible position and connecting arms 32 are in a horizontal configuration relative to ground. Hydraulic cylinders 26 are in the shortened position. It should be understood that the most preferable cylinders to be used in this invention are bidirectional cylinders as evidenced by the two inputs 31 and 35 on each of the cylinders. One of skill in the art will recognize that this allows a power strike in each direction. This not only speeds operation of the device but also facilitates the device lifting the tire as discussed below. By viewing FIG. 2, one of skill in the art will recognize that walking beam 40 has been moved upwardly by the extension of pistons 28 of cylinders 26 and that connecting arms 32 have been moved away from the horizontal, thus shortening the effective lateral length thereof and drawing the crushing arms 12 to the closed position which is illustrated in FIG. 2. As is illustrated subsequently in the drawings of this application, crushing arms 12 significantly deform the wheel of a tire and wheel combination during their movement toward their closed position.

Figure 4:
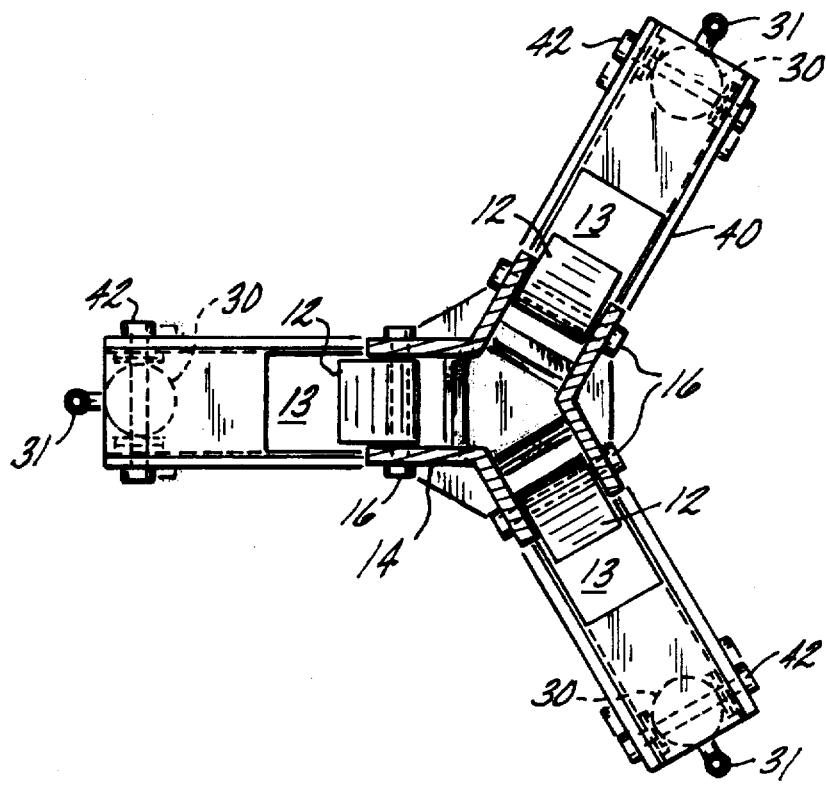
FIG. 4 is a sectional view taken along section line 4—4 in FIG. 2.

Referring now to FIGS. 1–5 simultaneously, crushing arms 12 are pivotally attached to hanger 14 with hanger pins 16; refer particularly to FIG. 4 for a plan view of this arrangement. Also illustrated well in FIG. 4 is the extension of crushing arms 12 through openings 13 in walking beam 40.

The lateral extent of walking beam 40 provides pivotal attachment for canisters 30 through canister pivots 42. The length of the lateral extent of walking beam 40 is important to the function of the invention since it must be long enough to prevent a significant off-vertical attitude of the canisters which would make them work against themselves at the beginning of the movement of the device. By the same token, if the lateral extent of the walking beam is too long, the device becomes unwieldy. Therefore, the length of the walking arm should be carefully chosen to conform to the size of the wheel being deformed from tires. The fully opened position hydraulic cylinders 26 should be maintained substantially vertical. While mounting the hydraulic cylinders 26 in the position as illustrated or in the inverted position is not germane to the function of the device, it is most preferred that the cylinders be mounted as illustrated to protect the seals thereof from the infiltration of contaminants, water, dirt, etc. Longer life of the unit results from this configuration. Moreover, shorter hydraulic fluid lines are employable. At the lower extent of walking beam 40, well illustrated in FIGS. 1 and 2, three connecting arm pivot pins, lexicographically termed drawing pins 44, are maintained in a small triangular configuration. At each end of each pin 44 is connected the inner end 32a of one connecting arm 32. It should be appreciated that six connecting arms 32 are the most preferable arrangement of the invention. Before leaving the area of 32a of connecting arms 32, it should be noted that in one embodiment of the invention stops 33 are provided on the walking beam 40 to prevent connecting arms 32 from being rotated past horizontal. This provides extra support points other than merely the pivots 24 of the cylinder pistons 28 described hereunder.

Connecting arms 32 extend from pivots 44 outwardly to pivots 24 located on brackets 22 connected to the outer surface of crushing arms 12. Brackets 22 are advantageous because they provide further leverage by extending the connecting arm pivot 24 point of crushing arms 12 laterally. Moreover, they allow for a longer connecting arm 32 and thus a longer stroke of the entire device. As one of skill in the art will readily appreciate a longer stroke translates to a larger initial diameter capability. Pivots 24 extend through piston 28 of hydraulic cylinder 26 and translate hydraulic cylinder power to crushing arms 12.

Figure 5:
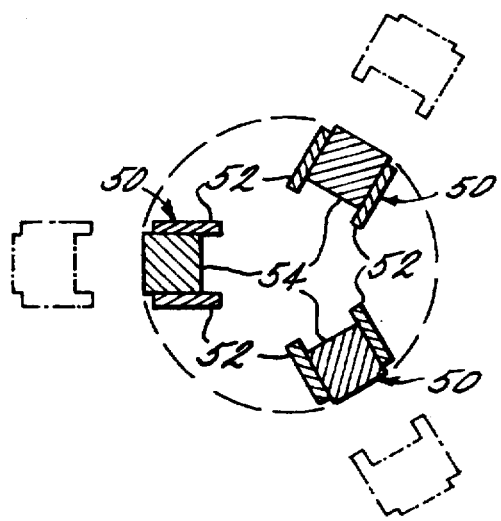
FIG. 5 is a sectional view of the invention taken along line 5—5 in FIG. 2.

Referring to FIG. 5, which is a section through FIG. 2 along section line 5—5, one can readily appreciate the construction of crushing arm fingers 50 made up of grips 52 and supports 54. It is fingers 50 which, in fact, contact the wheel portion of the tire and wheel combination and impart the crashing action thereto. Angled surface 56 of grips 52 provide additional holding power on the rim so that the device is less likely to slide off thereof. Supports 54 not only provide structural support for grips 52, but also provide a surface 58 which is employed subsequent to deforming the rim to frictionally engage a bead of the tire beam uncoupled so that such tire may be lifted away from the deformed rim.

Figure 6A:
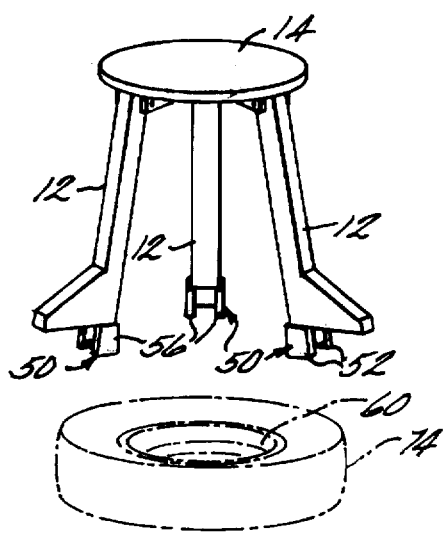
FIGS. 6A–J is a sequential schematic drawing set illustrating the action of the machine after a wheel/tire combination is positioned to be acted upon.
Figure 6B:
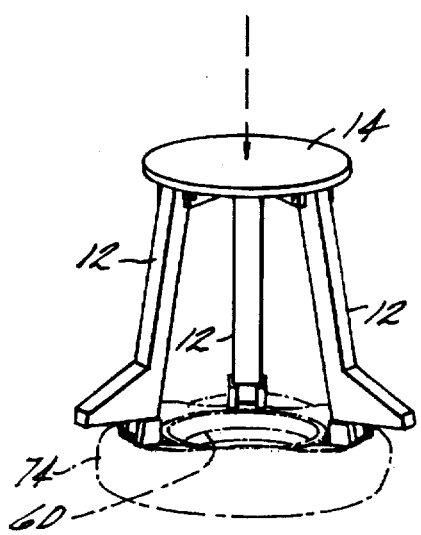
Figure 6C:
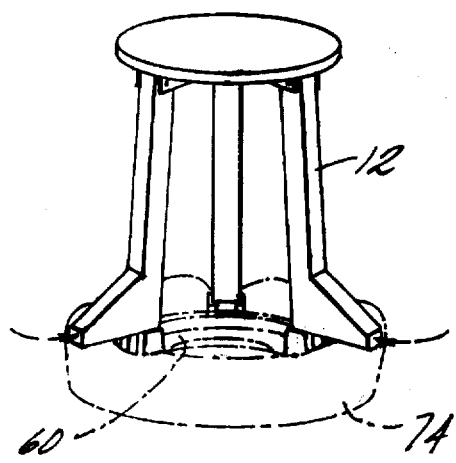
Figure 6D:
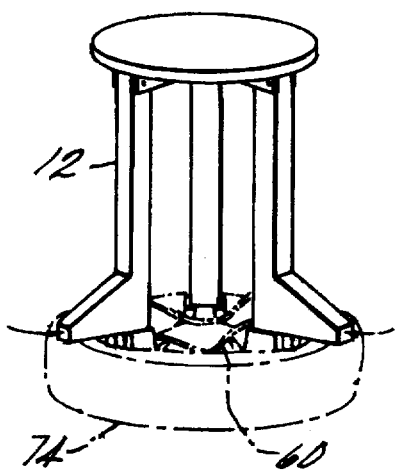
Figure 6E:
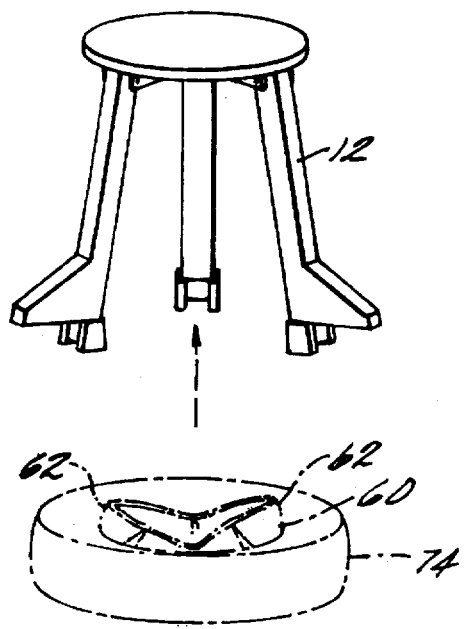
Figure 6F:
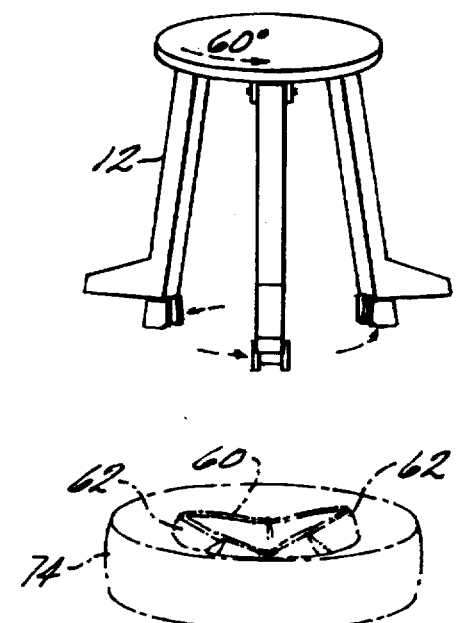
Figure 6G:
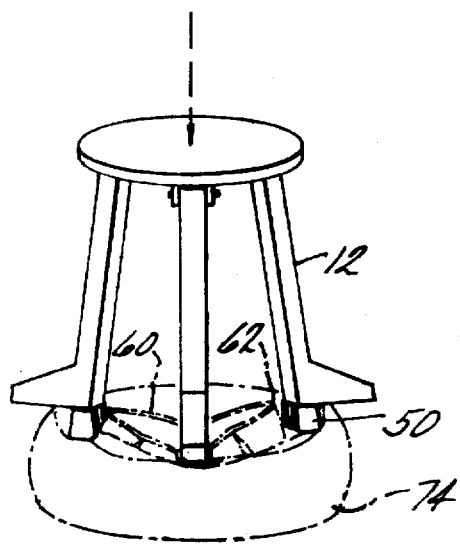
Figure 6H:
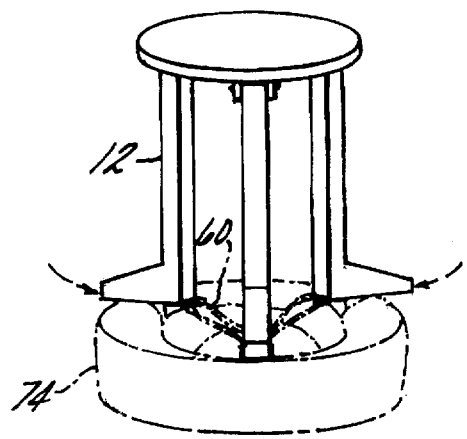
Figure 6I:
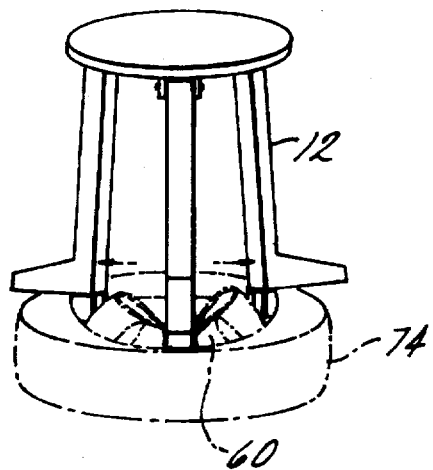
Figure 6J:
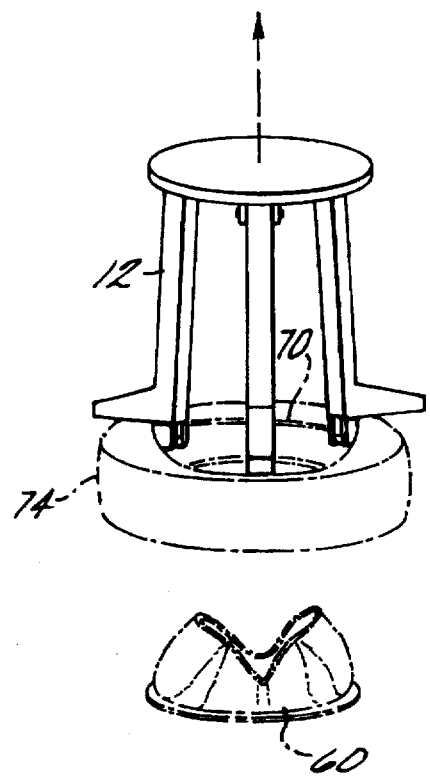

Referring now to FIGS. 6A–6J the operation of the device of the invention is illustrated and described. It will be noted that for clarity the device of the invention has been abbreviated in form to illustrate only the crushing arms and the movements they go through to uncouple the tire and wheel combination. In FIG. 6A the device is clearly positioned in the open position over the wheel and tire combination. In FIG. 6B the device of the invention has been plunged onto the rubber section of the tire 74 with each of the grips 52 adjacent the outer diameter of the rim. Upon the activation of hydraulic cylinders 26, crushing arms 12 begin to move inwardly as illustrated in FIG. 6C. FIG. 6D shows the invention in a more closed position, the rim having been deformed as illustrated. After a single deformity of the rim by the device of the invention, however, it is difficult to uncouple the tire, therefore in order to render uncoupling of the tire an easier operation, the device of the invention is advantageously rotated approximately 60° to position fingers 50 adjacent portions 62 of the rim 60 which retain to a substantial degree their original outer diameter. Portions 62 are well illustrated in FIGS. 6E and 6F. Upon so positioning of the device of the invention, approximately 60° rotated from its initial position, the device is again plunged onto the rubber of the tire 74 and wheel combination to position fingers 50 adjacent portions 62. This is illustrated in FIG. 6G. Subsequent actuation of the cylinders 26 closes the device of the invention and substantially deforms portions 62 thus also further deforming the initially deformed areas (FIG. 6H). In essence, this operation has completely collapsed one side of rim 60 leaving nothing but relatively weak adhesive forces between the tire and the other side of the rim to maintain the two in a coupled condition. As illustrated in FIG. 6I and FIG. 6J the device of the invention is opened while still engaged with rim 60 to provide a frictional engagement between surface 58 and bead 70 of tire 74 enabling the device of the invention to lift tire 74 away from rim 60.

It should be noted that the rotational device utilized in the present invention is one commercially available and common in the logging industry.

Figure 7:
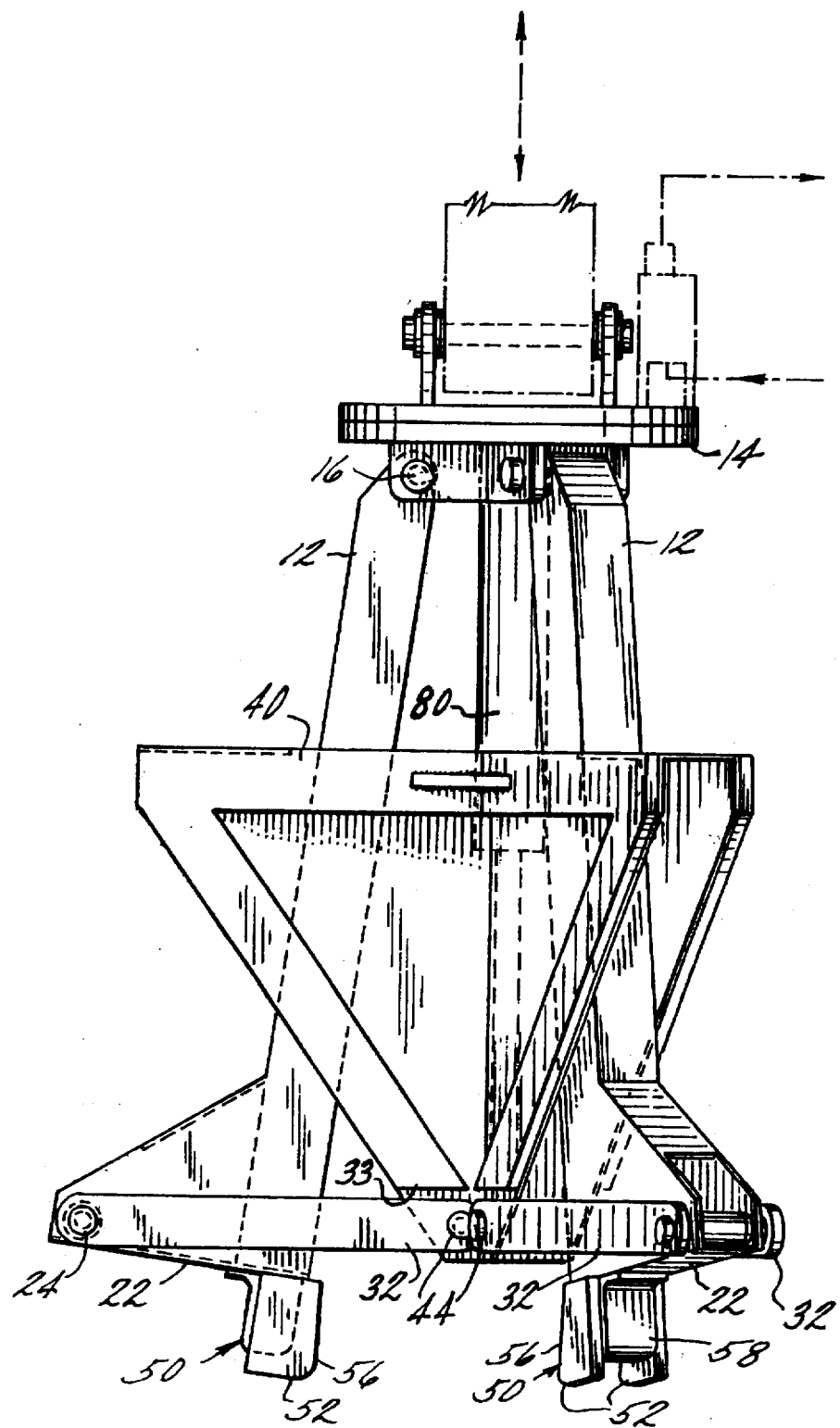
FIG. 7 is a schematic representation of an alternate embodiment of the invention in the open position.
Figure 8:
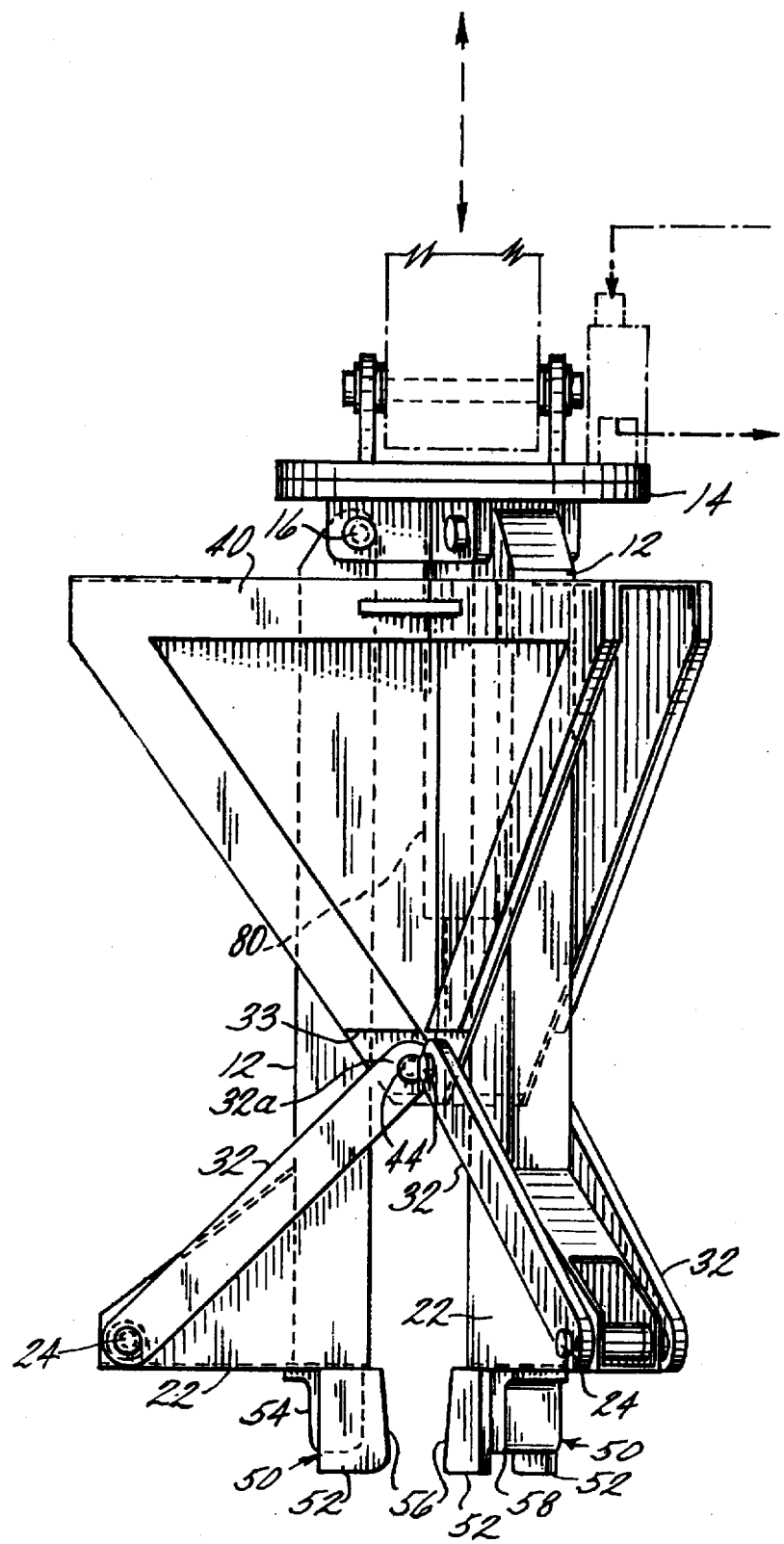
FIG. 8 is a schematic representation of the second embodiment in the closed position.

In an alternate embodiment of the invention the cylinders on each of the arms 12 are omitted and a single bidirectional cylinder 80 is mounted in the center of the walking beam 40. Shortening and lengthening of this cylinder which is illustrated schematically in FIG. 7 and FIG. 8 will provide the same action as the embodiment discussed above.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A tire derimming device comprising a set of elongated arms having first and second ends, said first ends being pivotally attached to a hanger plate, said second ends providing an offset connection construction for first ends of a set of hydraulic cylinders equal in number to said arms, said cylinders extending to a walking beam and being pivotally attached therewith at second ends thereof, said offset connection further being attached to a plurality of connecting members at first ends thereof said members being attached at second ends thereof to said walking beam.

2. A tire derimming device as claimed in claim 1 wherein said arms further include fingers depending from said second ends thereof.

3. A tire derimming device as claimed in claim 2 wherein said fingers include at least one grip and at least one support plate.

4. A tire derimming device as claimed in claim 3 wherein said at least one grip is two grips having angled inwardly facing planes whereby engagement with a wheel to be derimmed from a tire coupled therewith is enhanced.

5. A tire derimming device as claimed in claim 3 wherein said support plate further provides a frictional surface for engaging the tire being derimmed for removing the tire from the wheel.

6. A method for separating a tire and wheel combination comprising:
   a) providing a tire derimming device having a set of elongated arms having first and second ends, said first ends being pivotally attached to a hanger plate, said second ends providing an offset connection construction for first ends of a set of hydraulic cylinders equal in number to said arms, said cylinders extending to a walking beam and being pivotally attached therewith at second ends thereof, said offset connection further being attached to a plurality of connecting members at first ends thereof said members being attached at second ends thereof to said walking beam;
   b) engaging the tire and wheel combination;
   c) first deforming the wheel;
   d) rotating the device about 60 degrees;
   e) engaging the wheel;
   f) second deforming the wheel; and
   g) removing the tire from the wheel.

7. The method of claim 6 wherein subparagraph b further comprises plunging said device onto the tire of the combination to expose the wheel of the combination.

8. The method of claim 7 wherein said plunging subparagraph further deflated said tire.

9. The method of claim 6 wherein said first deforming subparagraph includes actuating said cylinders to raise said walking beam and impart movement to said connecting members whereby said wheel is deformed.

10. The method of claim 6 wherein said second deforming subparagraph further comprises aligning said arms with portions of said wheel that retain substantially the O.D. of the wheel prior to deforming and deforming those portions of the wheel to release said wheel from the tire and wheel combination.

11. The method of claim 6 wherein the subparagraph of removing the tire from the wheel further comprises opening the tire derimming device to abut a bead of said tire with said arms and provide frictional engagement therewith sufficient to remove said tire from said deformed wheel.

12. A tire derimming device comprising a set of elongated arms having first and second ends, said first ends being pivotally attached to a hanger plate, said second ends providing an offset connection construction for being attached to a plurality of connecting members at first ends thereof said members being attached at second ends thereof to a walking beam through which said arms extend, said walking beam further housing a cylinder disposed vertically in the center thereof, said cylinder being connected to the hanger plate such that elongation of the cylinder opens the device and shortening of the cylinder closes the device.

* * * * *